(12) United States Patent (10) Patent No.: US 8,591,339 B2
Santhosh (45) Date of Patent: Nov. 26, 2013

(54) METHOD AND APPARATUS FOR REPRESENTING COMPUTER GAME PLAYER INFORMATION IN A MACHINE-READABLE IMAGE

(75) Inventor: Sreelata Santhosh, Carlsbad, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

(21) Appl. No.: 13/172,809

(22) Filed: Jun. 29, 2011

(65) Prior Publication Data

US 2013/0005489 A1 Jan. 3, 2013

(51) Int. Cl.
*A63F 9/24* (2006.01)

(52) U.S. Cl.
USPC ............................................................ 463/42

(58) Field of Classification Search
USPC ....................................... 463/40–43; 273/292
See application file for complete search history.

(56) References Cited

U.S. PATENT DOCUMENTS

| | | | |
|---|---|---|---|
| 6,173,445 B1 | 1/2001 | Robins et al. | |
| 7,798,908 B2 | 9/2010 | Borgs et al. | |
| 2002/0122058 A1 | 9/2002 | Kutaragi et al. | |
| 2003/0078101 A1 * | 4/2003 | Schneider et al. | 463/42 |
| 2004/0224741 A1 | 11/2004 | Jen et al. | |
| 2004/0230786 A1 | 11/2004 | Kim et al. | |
| 2005/0026700 A1 | 2/2005 | Blanco | |
| 2005/0070359 A1 | 3/2005 | Rodriquez et al. | |
| 2005/0246565 A1 | 11/2005 | Koarai et al. | |
| 2006/0206700 A1 | 9/2006 | Umedu | |
| 2006/0252503 A1 | 11/2006 | Salter | |
| 2007/0099694 A1 | 5/2007 | McCarthy et al. | |
| 2008/0274798 A1 * | 11/2008 | Walker et al. | 463/25 |
| 2009/0048022 A1 * | 2/2009 | Iddings et al. | 463/42 |
| 2009/0124376 A1 * | 5/2009 | Kelly et al. | 463/29 |
| 2010/0293365 A1 | 11/2010 | Tandon | |
| 2010/0306773 A1 | 12/2010 | Lee et al. | |
| 2011/0081964 A1 * | 4/2011 | Acres | 463/30 |
| 2011/0130197 A1 * | 6/2011 | Bytnar et al. | 463/25 |
| 2011/0165933 A1 * | 7/2011 | Guziel et al. | 463/17 |
| 2011/0207531 A1 * | 8/2011 | Gagner et al. | 463/30 |
| 2012/0122558 A1 * | 5/2012 | Lyons et al. | 463/25 |

OTHER PUBLICATIONS

Patent Cooperation Treaty; "Notification of Transmittal of the International Search Report and the Written Opinion of the International Searching Authority, or the Declaration" issued in foreign application No. PCT/US10/34250, mailed Jul. 12, 2010, 2 pages.

(Continued)

*Primary Examiner* — Masud Ahmed
(74) *Attorney, Agent, or Firm* — Fitch, Even, Tabin & Flannery, LLP

(57) ABSTRACT

User information can be encoded into a machine-readable image for use in display on the surface of a tangible and portable apparatus. The machine-readable image may then be optically read by an offline or online processor-based apparatus to decode the information of the machine readable image including the user's identity and/or profile information and any of the user's: (i) preferred setting information (ii) game history information and (iii) previous game performance information. By swiping a personalized machine-readable image pertaining to the individual user, a user (or gamer) may cause the processor based system (i.e. game console system) to perform a number of functions. Updated user information may be re-encoded into an updated machine-readable image that may be easily printed or outputted to the user. The portable machine-readable image may thus be used for the convenient storage of information items to be used in either online or offline gaming environments.

26 Claims, 4 Drawing Sheets

(56) References Cited

OTHER PUBLICATIONS

Patent Cooperation Treaty; "International Search Report" issued in foreign application No. PCT/US10/34250, mailed Jul. 12, 2010, 3 pages.

Patent Cooperation Treaty; "Written Opinion of the International Searching Authority" issued in foreign application No. PCT/US10/34250, mailed Jul. 12, 2010, 8 pages.

USPTO; Office Action issued in U.S. Appl. No. 12/466,223, mailed Oct. 3, 2011, 14 pages.

* cited by examiner

METHOD AND APPARATUS FOR REPRESENTING COMPUTER GAME PLAYER INFORMATION IN A MACHINE-READABLE IMAGE

BACKGROUND OF THE INVENTION

1. Field of the Invention

The present invention relates generally to computer games and gaming, and more specifically to game player identification and tracking of a player's preferred setting information, game performance information, and game history information.

2. Discussion of the Related Art

Computer games, such as video games, have become a popular source of entertainment. Computer games are typically implemented in computer game software applications and are often run on game consoles and entertainment systems. Before game play begins, a player (also referred to herein as a user) often views one or more menu screens and makes selections, such as for example the type of character, the difficulty level of the game, etc. Many computer games keep track of a player's performance in the game, such as by maintaining a player's performance statistics.

SUMMARY OF THE INVENTION

One embodiment provides an apparatus comprising: a tangible surface; and a machine-readable image of information that is visible on the tangible surface, wherein the information comprises an identity of a user and at least one of: (i) at least a portion of the user's preferred setting information for one or more computer game applications, (ii) game history information for the user for one or more computer game applications, and (iii) previous game performance information for the user for one or more computer game applications.

Another embodiment provides a computer readable storage medium storing one or more computer programs adapted to cause a processor based system to execute steps comprising: reading information from a first machine-readable image, identifying an identity of a user in the read information, identifying the user's preferred setting information for a computer game application in the read information and automatically setting one or more user settings in the computer game application according to the user setting information.

Yet another embodiment provides a computer readable storage medium storing one or more computer programs adapted to cause a processor based system to execute steps comprising: receiving user information that comprises an identity of a user and at least one of, (i) at least a portion of the user's preferred setting information for one or more computer game applications, (ii) game history information for the user for one or more computer game applications, and (iii) previous game performance information for the user for one or more computer game applications; selecting at least a portion of the user information; and generating image data that represents a visual machine-readable representation comprising the selected user information.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

As mentioned above, before game play begins, a user often views one or more menu screens and makes selections, such as for example the type of character, the difficulty level of the game, etc. More specifically, many computer games and other computer software applications require a user (or player) to sit through a series of studio and game logos when the user first starts the game. That is, a user will typically need to view a title screen, logo screen, studio screen, license splash screen, etc., before the game puts the user in a main menu screen.

Once in the main menu screen, the user will then need to make one or more selections, such as for example the type of character, the difficulty level of the game, etc. Many games require that a user make selections from more than one menu screen. After making the required selections, the user can then get into the game and commence with game play. This scenario often applies to both online and offline games.

As also mentioned above, many computer games keep track of a user's performance in the game, such as by maintaining a user's performance statistics.

It is often a tedious process for a user to enter all of his or her preferred selections into the various menu screens. Furthermore, it can often be difficult for a user to keep track of all his or her performance statistics and provide them to others.

Some of the embodiments of the present invention provide a text/font based easily updated "Gamer-QR-card" (Gamer Quick Response card) barcode-like system to capture a player's preferences and/or his or her global statistics, whether playing off-line or on-line games. In some embodiments, it provides a mechanism to track a user and his/her gaming activities and patterns during offline and online game play and console usage. As such, embodiments of the present invention may encourage, promote, and enhance gamer community interaction and engagement with other members who share like interests.

Figure 1:
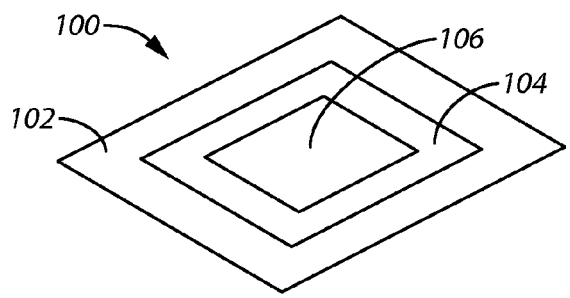
FIG. 1 is a perspective diagram illustrating an apparatus in accordance with an embodiment of the present invention.

Referring to FIG. 1, there is illustrated an apparatus 100 in accordance with an embodiment of the present invention. In some embodiments, the apparatus 100 provides a convenient way for a user to store and manage his or her preferences, global statistics, etc.

Specifically, the apparatus 100 includes a tangible surface 102 and a machine-readable image 104 of information 106 that is visible on the tangible surface 102. In some embodiments, the tangible surface 102 may comprise paper, cardboard, metal film, and/or plastic. For example, the tangible surface 102 may comprise a paper or plastic card or the like.

In some embodiments, the information 106 represented by the a machine-readable image 104 may comprise the identity of a user and/or at least one of the following items: (i) at least a portion of the user's preferred setting information for one or more computer game applications; (ii) game history information for the user for one or more computer game applications; and (iii) previous game performance information for the user for one or more computer game applications.

User identity information may include user profile information and/or virtually any other information that may be used to identity one or more users. For example, a user's identity information may comprise information pertaining to the user's online identity such as one or more of: account numbers, screen names, email addresses or network IDs.

For example, in one embodiment the user's identity information may include profile information comprising a Network Identification (Network ID), such as for a gaming community or the like. In some embodiments, the user's profile information may also comprise identification information such as a user's real or given name(s), nickname(s), aliase(s), gender, age, geographic location or occupation etc. Additionally, the user's profile information could include information that is chosen by or created by the user; for example, user information could comprise information related to a user's status updates or links to various networked resources, etc.

The user's preferred setting information may comprise any information pertaining to a user's specific preferences in relation to one or more games or game systems. In some embodiments, preferred setting information may comprise information related to a user's preferences pertaining to a specific game or character that may be typically is entered into one or more game menu or option screens. For example, the preferred setting information may comprise a variety of information items related to the user's preferences with respect to a specific simulation or hardware preferences. As further discussed below, in some embodiments, preferred setting information will allow a user to specify his or her online and offline preferences for a particular game, then whenever the game is launched the user's chosen preferences can be automatically applied to the current game simulation.

By way of example, preferred setting information could be used to put the user directly into a game without the need to first navigate some or all of the initial loading screens, such as for example, title screens, logo screens, studio screens, license splash screens or menu screens, etc.

In some embodiments the user's preferred setting information may allow the user to return or jump to a pre-determined location or scenario within a game simulation without the need first navigate (or re-navigate) at least some or all of the initial loading screens and/or portions of the game simulation. For example, the user setting information may enable a user to jump to a specifically saved location, map or scenario within a networked or stand along game.

The game history information may comprise any information related to a user's history of online or offline game play. For example, game history information may comprise information relating to the amount of time the user has spent playing a particular game or games. Game history information may also comprise information regarding, but not limited to: game titles, genres, time and/or duration of play, frequency of play and trophy information etc.

The game performance information may comprise information related to a user's performance statistics and/or other information indicative of a user's performance with respect to a specific game or games. Additionally, game performance information may include information related to a user's offline or online game performance, measured individually or with respect to other players. By way of example, game performance information could include information relating to a user's progress for a specific game title including: progress through levels, score or point accumulations, character upgrades or simulation credits etc. Game performance information may also include relative quantitative or qualitative information measured with respect to one or more other users or players, for example with respect to gaming member of an online community. In some embodiments, game performance information may comprise information pertaining to a user's relative performance as between different games and/or different plays of the same game.

In some embodiments, the information represented in the machine-readable image 104 may comprise at least two of information items (i), (ii) and (iii) as described above. In some embodiments, the information represented in the machine readable image 104 may comprise all of items (i), (ii) and (iii). In some embodiments, the information represented in the machine-readable image 104 may comprise other additional information and/or other various combinations of the above-described information items.

Figure 2:
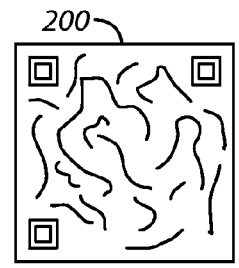
FIG. 2 is a top view illustrating a machine-readable image that comprises a two-dimensional (2D) code image in accordance with an embodiment of the present invention.

Referring to FIG. 2, in some embodiments, the machine-readable image 104 of information 106 may comprise a two-dimensional (2D) code image 200, such as what is known as a QR (quick response) code.

In some embodiments, the machine-readable image 104 of information may comprise a bar code. However, the machine-readable image 104 of information 106 may comprise essentially any type of machine-readable image or visual depiction that may be used to encode information.

Figure 3:
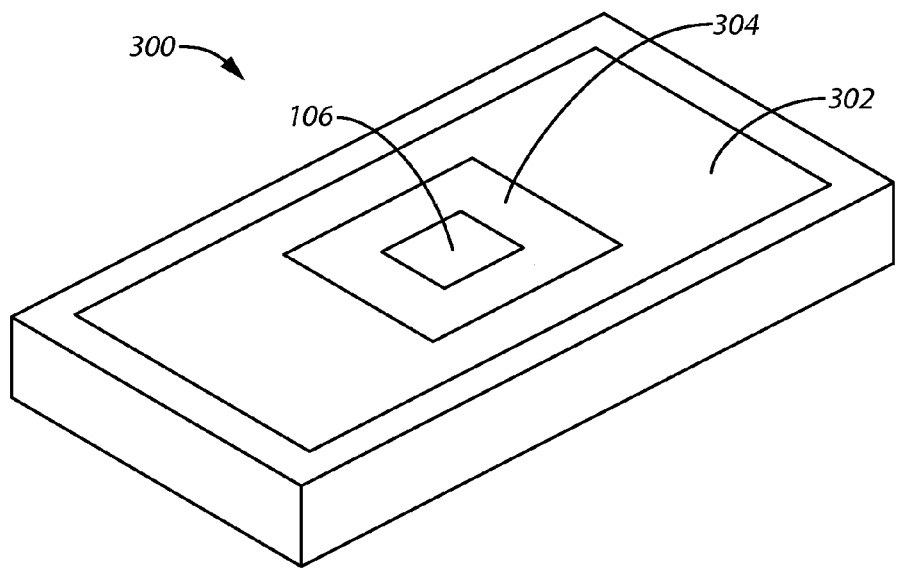
FIG. 3 is a perspective diagram illustrating an apparatus in accordance with another embodiment of the present invention.

In some embodiments, the tangible surface 102 may comprise a display screen. For example, FIG. 3 illustrates an apparatus 300 in accordance with another embodiment of the present invention. The apparatus 300 may comprise any device or screen capable of displaying the machine-readable image 104. By way of example, apparatus 300 may comprise a mobile phone, smart phone, hand-held, personal digital assistant (PDA), pad-like device, tablet-like device, computer, portable game device, etc. In one preferred embodiment the apparatus 300 includes a tangible surface in the form of a display screen 302 and a machine-readable image 304 of information that is visible on the display screen 302.

Figure 4:
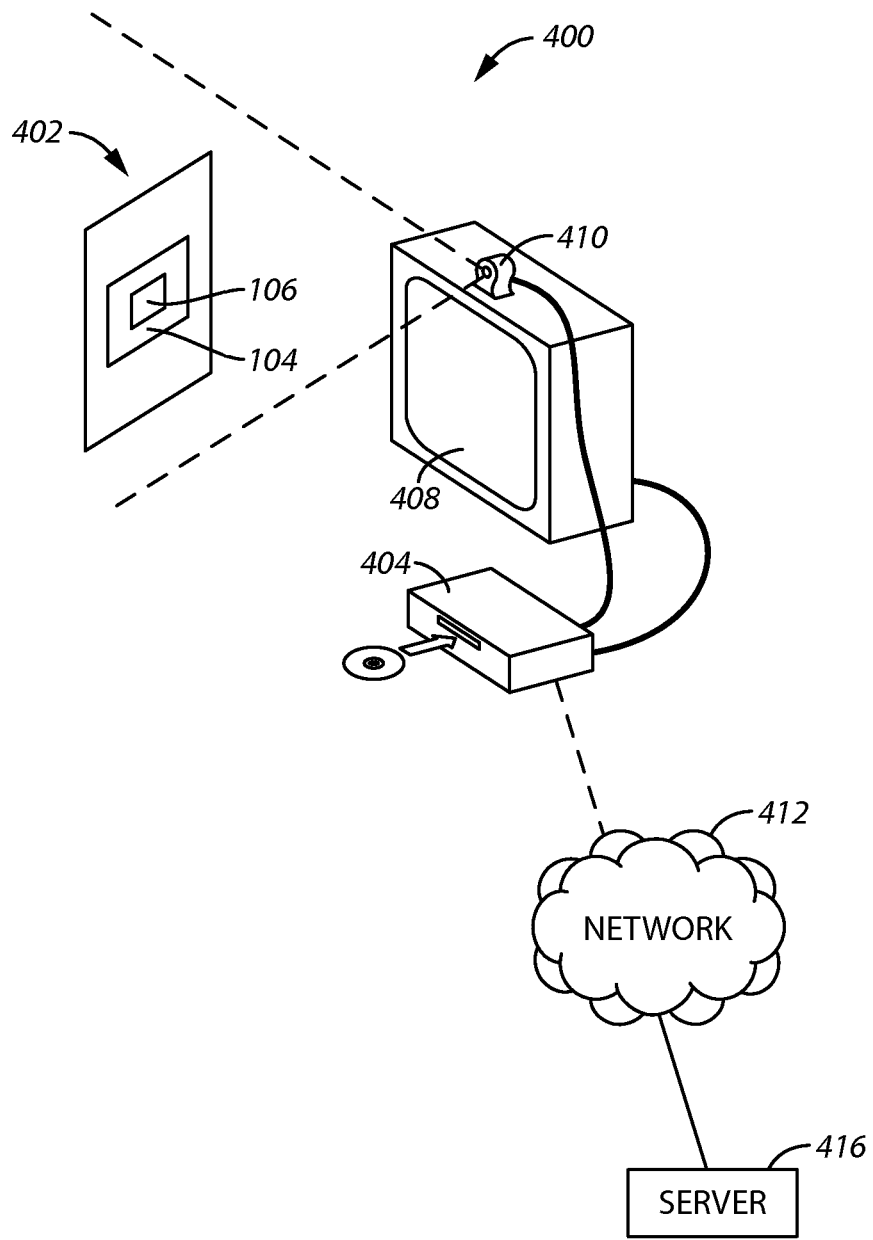
FIG. 4 is a perspective diagram illustrating a use of an apparatus in accordance with an embodiment of the present invention.

The apparatus 100 and the apparatus 300 provide a convenient way for a user to store and manage his or her game preferences, settings and global statistics, etc. FIG. 4 generally illustrates an embodiment of how either such apparatus may be used.

The methods and techniques described herein may be utilized, implemented and/or run on various processor based systems such as computers, workstations, entertainment systems, video game systems, media players, home servers, video game consoles and the like.

In some embodiments a processor based system may comprise an entertainment center or game system such as a game console. By way of example, the processor based system could include a television, computer, PSP, PS3, PDA or a similar device. Referring to FIG. 4, there is illustrated a system 400 that operates in accordance with an embodiment of the present invention.

Specifically, FIG. 4 illustrates an apparatus 402 in accordance with one embodiment of the present invention. More specifically, FIG. 4 depicts the apparatus 402 containing a machine readable image 104 (containing information 106), together with a display 408, optical-input device 410, processor based system 404 and a network 412 connected to a server 416.

As illustrated, the processor based system 404 is coupled to an optical input device 410 that may comprise an image or video capturing device, such as a camera. For example, in some embodiments the optical input device 410 may comprise a PLAYSTATION Eye™ or similar device. However, in other embodiments, the optical input device 410 may include a variety of optical devices, including but not limited to: web-based cameras, video cameras, CCD sensors, image or barcode scanners etc. Additionally, the optical input device 410 may either be separate from, or integrated with the processor based system 404.

The processor based system 404 may include, but is not required to include, a CPU, a graphics processing unit (GPU), a random access memory (RAM), and/or a mass storage unit, such as a disk drive. The processor based system 404 may also be coupled to or integrated with a display 408. By way of example, the display 408 may comprise a television, computer monitor or any other display device capable of displaying images of a computer game or other simulation thereon.

In some embodiments, computer game(s) or other simulation(s) may be stored on a removable memory device. By way of example, removable memory devices may include, but are not limited to: DVDs, CDs, Blu Ray discs, flash memory devices etc. In some embodiments, the computer game(s) or other simulation(s) may be stored on an internal memory of the processor based system 404 and/or may received from the server 416 via connection to a network 412, such as the internet.

In preferred embodiments, the processor-based system 404 may be operated in either an on-line or off-line mode. During off-line operation, the processor based system 404 will refrain from exchanging information with a communications network, for example the network 412. However, during online operation, the processor-based system 404 may communicate with one or more devices over via a communications network, such as network 412 using, a wired or a wireless connection.

In one preferred embodiment, a user can position apparatus 402 in the field of view of the optical input device 410 so that the optical input device 410 may read at least a portion of the machine readable image 104 contained thereon. Via the optical input device 410, the processor based system 404 can receive and process user information pertaining to any one (or all) of the user's: (i) preferred setting information; (ii) game history information; or (iii) game performance information, as described above. Information received by the processor based system 404 may be stored on a memory of the processor based system 404 and/or may be communicated to another device, such as server 416, via a computer network, such as the internet.

In one implementation of the present invention, the processor based system 404 may receive and process all or a portion of the available user profile information contained in the machine readable image 104. The received user profile information may then be displayed on the display 408 and/or applied to one or more of the computer game or simulation menu/option screens. Additionally, in some embodiments the user may have the ability to add to, edit, save or delete all or a portion of the user profile information. In one potential embodiment, the user profile information may be used to add one or more users to a buddy list, contact list or user profile etc. In another embodiment, one or more users may swap all or part of their individual profile information, for example to trade aliases, email addresses, screen names or Playstation Network IDs (PSN IDs) etc.

When the processor based system 404 is operated in the online mode, the user profile information may be transmitted to another device such as a server 416 via the network 412 or another computer network via a wired or wireless connection. In one embodiment, the user profile information may be uploaded as part of a web page or online user profile that is may be accessible via the internet. For example, the user profile information may be accessible as part of an online profile that is accessible over a network using a URL or other online resource locator.

In yet another embodiment, the processor based system 404 may receive and process all or a portion of the user's preferred setting information. In exemplary embodiments, the preferred setting information will allow a user to specify his or her online and offline preferences for a computer game or other computer software application. Because the machine readable image 104 is portable and may easily transported to and read at multiple locations, whenever a game is launched the processor based system 404 can automatically read the preference information and apply the user's preferred settings to the currently used game system (i.e. processor based device) and/or game simulation.

In some embodiments, the loading of the user's preferred setting information will enable the processor based system 404 to determine and load the user's preferred settings for particular processor based system, or game whenever the game is launched. In some embodiments, the loading of the user's preferred setting information will enable the user to bypass some or all of the initial game menu and/or option screens.

Additionally, the user's preferred setting information may also allow the user to return to (or jump to) a pre-determined location within a game simulation without the need for first navigating at least some of the loading screens and/or portions of the game simulation. For example, the user setting information may enable a user to jump to a specifically saved game scenario, map or level within a particular simulation.

In some embodiments, the preferred setting information could be used to put the user directly into a specifically desired game without displaying some or all of the initial loading screens, such as the above-mentioned title screens, logo screens, studio screens, license splash screens, menu screens, etc. For example, the next time the game is launched, some or all of the initial loading screens could be skipped and automatically logging the user in, searching for his or her game, and then placing the user into the game. It is believed that many users would have a more satisfying experience by being put directly into the game or other application without having to view some or all of the initial menus/loading screens etc. In some embodiments, application of the preferred setting information may place a user into an online or network-based game.

Additionally, in some embodiments the processor based system 404 will allow the user to edit, delete and/or store at least a portion of the preferred setting information. When operated in an online mode, the processor based system 404 may also be capable of communicating with other processor based devices, such as the server 416, to exchange data for the storage, update and retrieval of the user's preferred setting information. By way of example the processor based system 404 may be capable of uploading and downloading information to/from a server (e.g., the server 416) on a network (e.g., the network 412) such as the internet (i.e., the "cloud").

In some embodiments, a user's preferred setting information will be remotely stored (i.e., "backed up") on one or more processor based devices via a network (e.g., the network 412 or "the cloud"). In some embodiments, the remotely stored preferred setting information could comprise information including a save point or checkpoint for one or more game titles and may enable the user to resume a particular game title (at a desired point) at a later time or on a different device.

By way of example, a user may engage in game play for a particular title on a first device (e.g., the user may play a particular title on a PS3). Upon reaching a stopping point (e.g., an in game-checkpoint) the preferred setting information, including the user's desired save point, will be backed up to the cloud (e.g., saved to the server 416 via the network 412). Subsequently, when the user resumes game play for the same title on a different device (e.g., game play is resumed on a PC or portable device such as a PSP) the game will be re-started at the save point. This cloud-save/cross play feature would be very satisfying to the user as he or she can continue with the game-play experience amongst multiple devices on which the game is offered.

In some embodiments, the processor based system 404 may receive and process all or a portion of the user's game history information enabling the processor based system 404 to determine and/or display information regarding the user's previous game play. The received game history information may be used in a number of ways to provide feedback to the user and/or provide comparisons between on or more users. In some embodiments the game history information may be updated with more recent information pertaining to the user's game history statistics.

In another embodiment, the processor based system 404 may receive and process all or a portion of the game performance information for one or more players to be used for display and/or comparison. For example, when the processor based system 404 receives game performance information pertaining to multiple players, the processor based system 404 may display information comparing the two players' performance with respect to one or more games.

In one embodiment, the processor based system 404 will process the game performance information relating to multiple users and will display all or a portion of the information one or more displays, such as display 408, so that one or more users may view and compare performance information. For example, comparison of one or more players' performance information may facilitate in comparing users' trophies, tournament rankings, declaring contest winners and/or in merely comparing various performance statistics such as point or score totals etc.

In one preferred embodiment, the processor based system 404 will generate image data representing a new or updated machine readable image 104. For example, the processor based system 404 may update the machine readable image 104 with every use of the machine readable image 104. In some embodiments, the image data representing the generated machine readable image 104 may be comprised of information received by one or more users, retrieved from a local storage or downloaded from another device, such as server 416.

Figure 5:
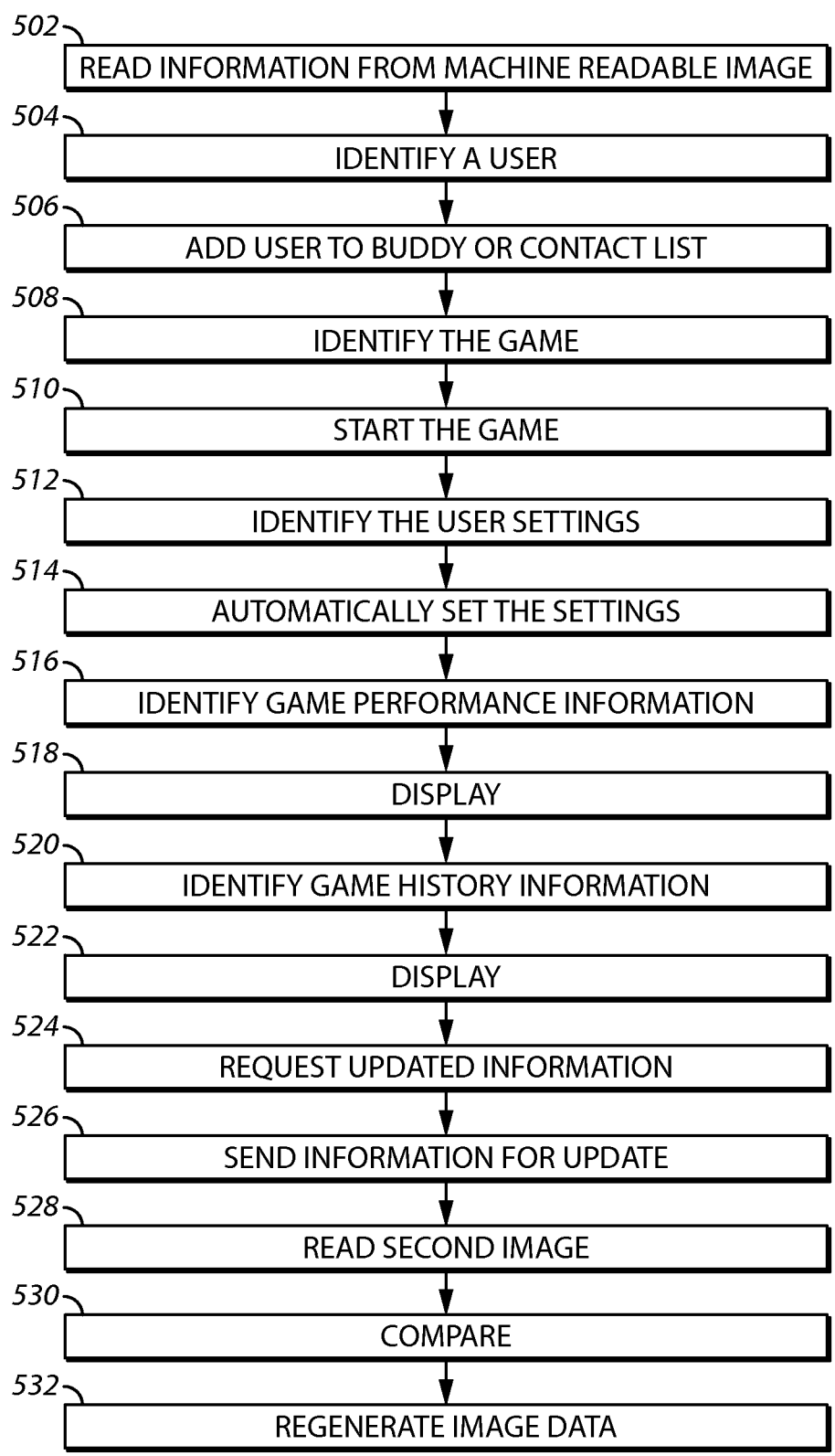
FIG. 5 is a flow diagram illustrating a method in accordance with an embodiment of the present invention.

Referring to FIG. 5, there is illustrated a method 500 that operates in accordance with one embodiment of the present invention. According to some embodiments, the steps in the method 500 may be optional and may depend on what types of information are included in the machine readable image.

The method begins in step 502 in which a first machine readable image 104 is read by an optical input device connected to a processor based system 404 such as a console game system, as described above with respect to FIG. 4. The machine readable image 104 may be displayed on virtually any type of apparatus such as those described above with respect to FIGS. 3 and 4. For example, the machine readable image 104 may be visible on the surface of a paper or plastic card (i.e. a "Gamer Virtual Card" or a Gamer QR Card"). In other embodiments the machine readable image 104 could be displayed on a display screen, for example on a computer monitor or the screen of a portable device such as a mobile phone, PSP, PDA, tablet device etc.

In some implementations, reading of the machine readable image 104 by the optical input device will occur when a user positions at least a portion of the machine readable image 104 into the field of view of the optical input device. In a preferred embodiment, upon reading the machine readable image 104, at least a portion of the user information contained thereon will be received by processor based system 404. The information received may include any or all of the user's identity and/or profile information and (i) preferred setting information; (ii) game history information; or (iii) game performance information, as described above. In step 504, the processor based system 404 identifies a particular user or player. Identification may occur based at least in part on user profile information retrieved from the machine readable image 104 in step 502.

In step 506, the processor based system may add at least a portion of the received user profile information to a contact list such as an address book or buddy list. By way of example, user profile information may include, but is not limited to, information items related to the user's personal identification such as the user's name, alias, email address, screen name, PlayStation ID etc. Furthermore, user profile information could also comprise a user's preferential setting information and/or hardware configuration information such as (but not limited to), controller type for a particular game title, identification information pertaining to the user's TV (e.g., HD or not), monitor resolution and/or display characteristics (e.g., 3D or not), NAT type, geo location information, Console ID for game-play session, top 10 games played, etc. The user profile information may be added to a contact or buddy list and used to facilitate communication between users. In some implementations, users may use their own respective machine readable images to conveniently swap or trade contact information/user profile information or the like.

Proceeding to step 508 wherein the processor based system 404 identifies a game or simulation to be played. In some embodiments, the processor based system 404 may determine what game or simulation is desired based at least in part on the received user information. In one embodiment, the processor based system may determine the desired game or simulation to be played based upon a selection made by the user on one or more menu or option screens. In step 510, the processor based system 404 loads and executes the game. When operated in an offline mode, the game or simulation may be loaded and/or played from a local storage device such as a removable optical medium or a mass storage device. However, during online operation, the loading and/or execution of the game or simulation may involve communication with one or more processor based devices such as server 416, like that discussed above with respect to FIG. 4, via a computer network, such as the internet.

Proceeding to step 512, the processor based system identifies the user's preferred setting information. As discussed above, the preferred setting information can include any information pertaining to the user's preferred online or offline settings for one or more game simulations or processor based devices (e.g. consoles, computers, entertainment systems, portable devices etc.).

By way of example, the user's preferred setting information could include information regarding the specific configuration of a character or other aspect of the game. For example, the preferred setting information may contain information related to a user's character selection preferences or visual and/or audio preference e.g., language options, input device options, display options etc.

In yet another example, the preferred setting information may contain information related a saved point or scenario within a game map or level. For example, the preferred setting information may contain data related to a user's most recent progress in a game and may be used to save the user's "spot" in a particular game.

In step 514, the processor based system 404 applies the user's preferences and/or settings based on the user's preferred setting information identified in step 512. By way of example, the processor based system 404 may automatically load a particular game or set of options pertaining to a specific game or character. In one embodiment the application of the user's preferred setting information may load a user's saved screen preferences and/or options so that the user's settings may be restored on the processor based system 404. Additionally, application of the user's preferred setting information may cause the processor based system 404 to jump to a particular location or scenario so the user can quickly join or resume, either online or offline, game play without first navigating some or all of the game's initial loading, menu or option screens etc.

In step 516, the processor based system 404 identifies the user's game performance information. Game performance information may include any type of performance information relating to one or more games played by the user. By way of example, game performance information may include quantitative information pertaining to a user's previous performance or progress in one or more simulations. For example, game performance information may include scores, point totals, time records etc. A user's game performance information may also include qualitative information related to one or more online or offline players or may indicate a user's relative standing with respect to past game play (e.g., online or tournament play etc.). In step 518 the user's game performance information is displayed to one or more users. In some embodiments only a portion of the user's game performance information may be displayed or, optionally may only be displayed to a select group of one or more players.

In step 520 the processor based system 404 identifies the game history information. Game history information may include any information regarding the user's game-play history. For example, game history information could include any information pertaining to previously played titles or genres and/or a frequency of play, duration of play etc. In step 522 the processor based system displays at least a portion of the user's game history information on one or more displays.

In step 524 the processor based system 404 issues a request for updated user information. Updated information can be aggregated automatically or provided manually by the user. Alternatively, updated user information may be retrieved from another processor based device, such as a server via a wired or wireless connection to a network, such as the internet. Updated user information could include user identity and/or profile information in addition any or all of the following information items: (i) preferred setting information for one or more computer game applications, (ii) game history information for the user for one or more computer game applications, or (iii) previous game performance information for the user for one or more computer game applications.

In step 526 the processor based system communicates with a server to send and/or receive updated user information. By way of example, the processor based system 404 may cause the updated user information to be sent to and stored on the server. In alternative embodiments, the processor based system 404 may receive new or updated user information from the server and may store the new or updated user information locally on one or more memory devices in communication with the processor based system.

In an alternative embodiment, when the processor based system 404 is operated in an offline-mode, updated user information may be stored on one or more local memory devices. By way of example, the local memory devices could include a random access memory (RAM), a mass storage unit, such as a disk drive or a flash based memory device such as USB memory storage etc. In other embodiments, the local memory may be comprised of an optical medium such as a DVD, DVR, Blu-Ray disc etc.; however, the local memory devices may be comprised of essentially any non-transitory storage means.

In step 528 the processor based system 404 receives information from a second machine-readable image 104. In step 530 the processor based system 404 compares at least a portion of the user information of the first machine-readable image to at least a portion of the user information received from the second machine-readable image. In other embodiments, the processor based system 404 may compare the user information from three or more machine-readable images 104. In some embodiments, the processor based system 404 may compare the user information retrieved from one or more machine-readable images 104 with user information retrieved from a server, via a computer network such as the internet.

In optional step 532, the processor based system 404 may generate a new machine-readable image 104 based on new or updated information. In some embodiments, the new (or updated) machine-readable image 104 will comprise information related to at least a portion of the user's identity or profile information and may further include: (i) preferred setting information; (ii) game history information; or (iii) game performance information. In preferred embodiments, the new or updated machine-readable image 104 will contain user information pertaining to all of items (i), (ii) and (iii) listed above.

As mentioned above, some of the steps of the method 500 may be optional. By way of example, steps 516-522 may be optional in embodiments wherein the machine-readable image 104 does not contain game history or game performance information.

In preferred implementations, the new or updated machine-readable image 104 may be easily captured, displayed and/or printed on a tangible apparatus such as a card or the screen of a mobile device that may be easily transported. In some embodiments, the information representing the new/updated machine readable image 104 may be sent to other processor devices such as for example, mobile phones or servers etc.

Figure 6:
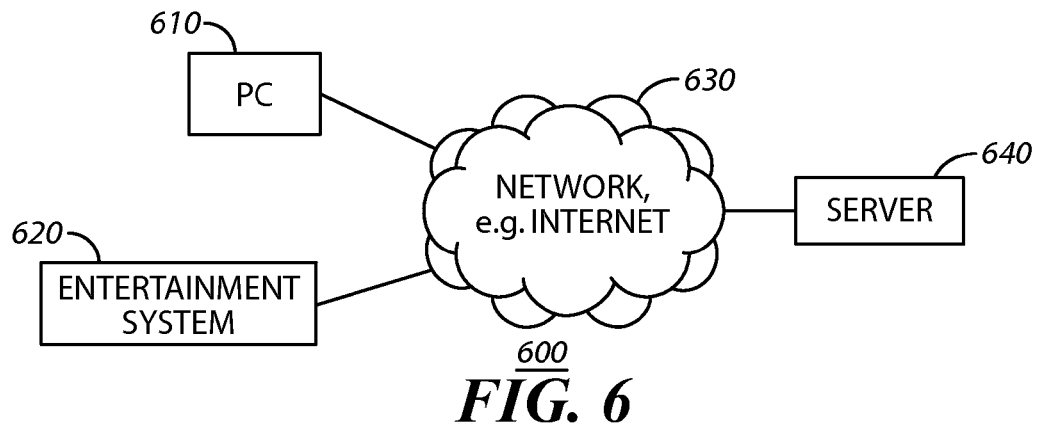
FIG. 6 is a block diagram illustrating a system in accordance with another embodiment of the present invention.

Embodiments of the present invention may be used in stand alone games or in network game environments. Referring to FIG. 6, there is illustrated a system 600 that may be used in implementing a network or online gaming environment in accordance with some embodiments of the present invention. In the system 600, users or players are able to interact with each other, such as for example in a network game.

The system 600 includes a computer (PC) 610, an entertainment system 620, a network 630 and a server 640. By way of example, the entertainment system 620 may comprise essentially any type of processor based device capable of engaging in the network gaming features described herein. For example, the entertainment system 620 could comprise, but is not limited to, a game console such as a PS3 or a handheld device such as a PSP, PDA or mobile phone etc. By way of further example, the network 630 may comprise virtually any communication network, including but not limited to wired or wireless private or local area networks (LANs), wide area networks (WANs), the PlayStation Network (PSN) or the internet (i.e., the "cloud"). In some embodiments, either one of or both of the PC 610 and the entertainment system 620 may be networked devices and may be coupled to the network 630. Other devices may also be coupled to the network 630, such as for example the server 640.

In a preferred embodiment of the present invention the PC 610 and the entertainment system 620 will be configured for online operation. When operating in an online mode, the PC 610 and entertainment system 620 may communicate with each other and/or other devices coupled to the network 630 (such as server 640) to execute an online game or simulation.

In one preferred embodiment, information 106 pertaining to one or more users/players may be received by the PC 610 or entertainment system 620 via the optical reading of machine readable image 104. Alternatively, information 106 may also be received at the entertainment system 620 or PC 610 from the server 640 via network 630. In some preferred embodiments, information 106 may be retrieved or stored by any type of console system, computer or portable device, configured for engagement with a game or other simulation.

In one implementation of the present invention, receipt of the information 106 will cause the PC 610, entertainment system 620 and/or the server 640 to load at least a portion of any number of: (i) the user's preferred setting information, (ii) the user's game history information, and/or (iii) the user's previous game performance information.

In one embodiment, the reading/loading of information 106 will enable system 600 to take a player directly to his/her game of choice, independent of the device platform used by the user (e.g. PC 610, entertainment system 620, or another device).

In some embodiments, the information 106 may be remotely stored (i.e., "backed up") on one or more processor based devices (e.g., the server 640) via a network (e.g., the network 630 such as the internet or "the cloud"). In some embodiments, the information 106 could comprise data pertaining to a save point or checkpoint for one or more game titles and that may enable the user to resume a particular game title (at a desired point) at a later time or on a different device. By way of example, a user may engage in game play for a particular title on a device (e.g., on the PC 610). Upon reaching a stop point the information 106 (including data related to the user's desired save point), will be backed up to the cloud (e.g., saved to the server 640 via the network 630). Subsequently, when the user resumes game play for the previously played title on a different device (e.g., game play is resumed on the entertainment system 620) the game will be resumed at the user's chosen save point. This cloud-save/cross play feature would be very satisfying to the user as he or she can continue with the game-play experience amongst multiple devices on which the game is offered.

In one preferred embodiment, as information 106 is updated or changed by the user (i.e. updated manually or automatically throughout game-play) the information 106 may be synced with the server 640 for later retrieval. After syncing with server 640, the updated information 106 may be retrieved and/or downloaded to any device that may communicate with the server 640. By way of example, any portion of information 106 may be displayed to one or more users via a webpage or through one or more game display screens etc.

For example, in one preferred embodiment, a URL can be generated that will point to a webpage containing all or a portion of information 106 and/or the corresponding machine readable image 104. In some embodiments multiple users may compare any of their identity and/or profile information in addition to (i) preferred setting information (ii) game history information, and/or (iii) previous game performance information, via one or more web pages or display screens.

In another embodiment, image data corresponding to an updated machine readable image 104 may be generated by any of PC 610, entertainment system 620 or server 640 that represents all or a portion of a user's current information 106. For example, PC 610 or entertainment system 620 may produce a new machine readable image 104 that may be displayed or printed locally. In one embodiment, the machine readable image 104 may be printed as a quick response code (QR code) that represents a particular game in the form of a "Gamer Virtual Card." Thus, multiple players may easily store and swap and compare information related to a number of games either during online or offline game play.

In another embodiment, a new machine readable image 104 may be produced by and/or stored on the server 640. In some embodiments, the machine readable image 104 generated by server 640 can be sent from the sever 640 to a processor based device connected to network 630 (e.g., PC 610 and/or entertainment system 620). In other embodiments, the new machine readable image 104 generated by server 640 may be displayed as part of a webpage accessible via the network 630.

Figure 7:
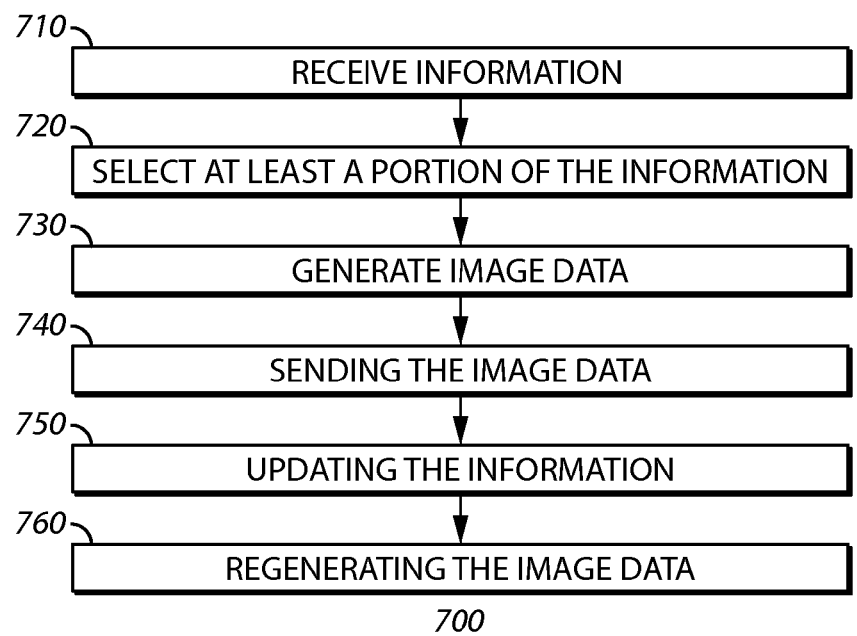
FIG. 7 is a flow diagram illustrating a method in accordance with another embodiment of the present invention.

Referring to FIG. 7, there is illustrated a method 700 performed a server, such as for example server 640 of FIG. 6. The method begins in step 710 in which user information is received by server 640. In some embodiments, the user information received in step 710 will be the first user information pertaining to a specific user that is received by the server. In other embodiments, the user information received in step 710 will correspond to new or updated user information.

In step 720, the server selects at least a portion of the received user information for use in generating a new or updated machine readable image 104. In step 730, the server generates image data representing a new/updated machine readable image 104 in which the machine readable image 104 is representative of at least a portion of the user information selected in step 720.

In step 740, the server transmits the image data corresponding to the machine readable image 104. In one preferred embodiment, the image data corresponding to a machine readable image 104 is transmitted to a processor based device such as PC 610 or entertainment system 620, via a network 630 as discussed above with respect to FIG. 6. In some embodiments, the image data is stored at the server or another location accessible via a network such as the internet. In some embodiments, the stored image data may be available in the form of a web page or online user profile.

In step 750, the server receives new or updated user information. In some embodiments the new or updated user information may be received by the server automatically; for example, due to changes in the player's game preferences, profile information, game statistics or history information etc., caused as a result of the player's game play. In alternative embodiments, server may receive new and/or updated player information as the result of an explicit update request made by the server or the player. For example, a player may have an online profile that contains (or is linked to) all or a portion of the player's information. The player may add or change his or her user information by making changes to his or her online user profile.

In step 760 the server re-generates image data corresponding to an updated machine readable image 104. In some embodiments, the updated machine readable image 104 is stored by server. Alternatively, in some embodiments the updated machine readable image 104 is transmitted to a processor-based device, for example, via a network 630 such as that depicted in FIG. 6.

Figure 8:
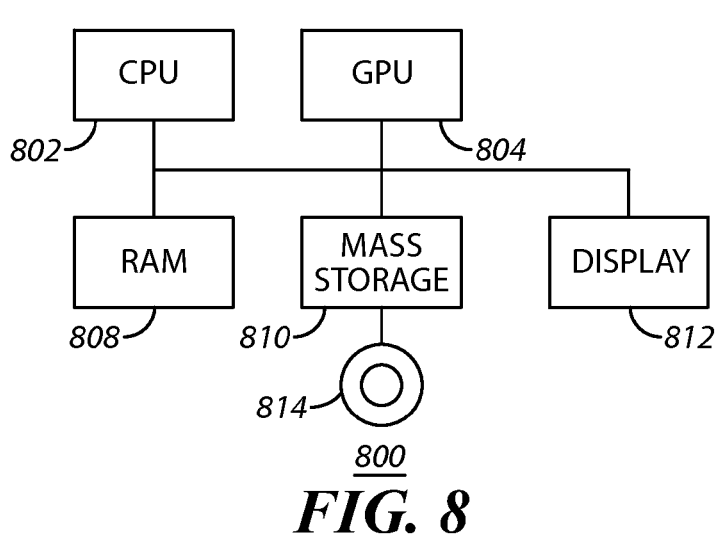
FIG. 8 is a block diagram illustrating a computer or other processor based apparatus/system that may be used to run, implement and/or execute any of the methods and techniques shown and described herein in accordance with the embodiments of the present invention.

The methods and techniques described herein may be utilized, implemented and/or run on many different types of systems. Referring to FIG. 8, there is illustrated a system 800 that may be used for any such implementations. One or more components of the system 800 may be used for implementing any system/s or device/s mentioned above, such as for example any of the above-mentioned computers, game consoles, entertainment systems, servers etc. However, the use of the system 800 or any portion thereof is certainly not required.

By way of example, the system 800 may include, but is not required to include, a central processing unit (CPU) 802, a graphics processing unit (GPU) 804, a random access memory (RAM) 808, and a mass storage unit 810, such as a disk drive. The system 800 may be coupled to, or integrated with, any of the other components described herein, such as a display 812. The system 800 comprises an example of a processor based system. The CPU 802 and/or GPU 804 may be used to execute or assist in executing the steps of the methods and techniques described herein, and various program content, images, title screens, logo screens, studio screens, splash screens, credit screens, menu screens, main menu screens, etc. may be rendered on the display 812.

The mass storage unit 810 may include or comprise any type of computer readable storage or recording medium or media. The computer readable storage or recording medium or media may be fixed in the mass storage unit 810, or the mass storage unit 810 may optionally include removable storage media 814, such as a digital video disk (DVD), Blu-ray disc, compact disk (CD), USB storage device, floppy disk, or other media. By way of example, the mass storage unit 810 may comprise a disk drive, a hard disk drive, flash memory device, USB storage device, Blu-ray disc drive, DVD drive, CD drive, floppy disk drive, etc. The mass storage unit 810 or removable storage media 814 may be used for storing code or macros that implement the methods and techniques described herein.

Thus, removable storage media 814 may optionally be used with the mass storage unit 810, which may be used for storing code that implements the methods and techniques described herein, such as code for running the above-described alternative start-up mode and features. However, any of the storage devices, such as the RAM 808 or mass storage unit 810, may be used for storing such code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 808 or mass storage unit 810, may be used for storing any needed database(s).

In some embodiments, one or more of the embodiments, methods, approaches, and/or techniques described above may be implemented in a computer program executable by a processor based system. By way of example, such processor based system may comprise the processor based system 800, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for quick launching a software application or system. As another example, such computer program may be used for implementing any type of tool or similar utility that uses any one or more of the above described embodiments, methods, approaches, and/or techniques. In some embodiments, the computer program may comprise a video game, role-playing game (RPG), other computer simulation, or system software such as an operating system, BIOS, macro, or other utility. In some embodiments, program code macros, modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer readable storage medium storing one or more computer programs adapted to cause a processor based system to execute steps comprising:

Reading a machine readable image 104 containing user information and processing at least a portion of the user information; wherein the user information comprises any portion of (or all of) the user's (i) preferred setting information; (ii) game history information; or (iii) game performance information.

Identifying a user based at least in part on the user information read from the machine readable image 104. In some embodiments, the processor based system may optionally add a user's name and/or contact information (such as online screen name, email address etc.) to a buddy list or contact list for use in communicating with other users or gamers. For example, a user may scan the machine readable image 104 of a friend/fellow-gamer by positioning an apparatus (e.g. a gamer virtual card or the screen of a portable device such as a smart phone) containing the machine readable image in front of an optical input device connected to the processor based system. Upon reading the machine readable image 104, the processor based system 404 can add the friend/fellow-gamer's name or contact information to one or more contact or buddy lists. In this way, fellow gamers may easily and conveniently swap contact information in either an online or offline setting.

By way of example, the scanning of a particular player's machine readable image 104 may offer an easy and convenient way of tracking players at gaming events or tournaments. For example, gamers may easily scan their respective machine readable images at a booth or other live exhibit using, for example, a printable card or the screen of a mobile device displaying the machine readable image 104.

In yet another embodiment, after reading the user information from the machine readable image 104, the processor based system may identify and automatically load/execute the game or simulation that is desired by the user. For example, based on the received user information, the processor based system 404 may determine that the gamer wishes to play "Metal Gear Solid 4: Guns of the Patriots." In response, the processor based system can load/execute this game title.

Additionally, in some embodiments, the processor based system can also identify the user's preferred setting information pertaining to a specific title and may automatically set the user's preferred settings. For example, the processor based system 404 may determine the user's specific system options and/or preferences for a user's character in a particular title; upon game execution, the processor based system can load all or a portion of the user's preferred system and game settings, such as character options, game controller settings and display settings etc.

In some embodiments, the user's preferred setting information may enable the processor based system to return to (or jump to) a specific location or scenario within a particular game or simulation. For example, the processor based system 404 may cause the player's character to jump to a particular level or point in the game that has been previously chosen or saved by the player.

In some embodiments, the processor based system 404 can identify the user's game performance information related to the previous play of one or more games. Game performance information may encompass any type of information pertaining to the user's playing performance. The processor based system 404 may optionally display all, or any portion of, the user's performance information.

In some embodiments, the processor based system may identify one or more information items related to the user's game history information and may display either some or all of this information to one or more users. For example, the processor based system 404 may display a list of one or more users' most frequently played game titles or preferred genres.

In some embodiments that processor based system 404 may generate a request to receive updated user information. Updated user information may be received directly from the user or may be received from an external source such as a server via a network.

For example, the processor based system 404 via one or more menu or pop-up option screens may request updated user information from the user. In one preferred embodiment, a user could provide the requested updated information by scanning a machine readable image (e.g. in the form of a Gamer Virtual Card) into an optical input device (e.g. a camera such as the PlayStation Eye). In alternative embodiments, a user might provide the requested updated user information my manually entering the requested information into one or more menu or option screens. In preferred embodiments, user information will be updated with each use of the machine readable image 104.

In some embodiments, the processor based system may store new or updated user information to one or more memory devices. For example, the processor based system 404 may store updated user information to a local mass storage device such as a flash-based memory, magnetic or optical disk. Alternatively, the processor based system 404 may transmit updated user information to one or more devices via a wired or wireless connection. For example, the updated user information may be transmitted from the processor based system 404 to a server via the internet.

In one preferred embodiment, the processor based system will generate new or updated image data pertaining to one or more new/updated machine readable images. For example, the processor based system may generate a new machine readable image 104 based on the user's most recently known profile information, preferred setting information, game history information, and/or game performance information.

In some embodiments, the processor based system 404 will read in one or more additional machine readable images and may compare the user information corresponding to one or more of the processed machine readable images.

For example, by reading in multiple machine readable images from different gamers, the processor based system 404 may conveniently compare any number of game play statistics for multiple players. By way of example, using each gamers' respective user information, the processor based system may easily compare rank or point totals as between multiple players for one or more games.

As another example, in some embodiments the present invention provides a computer readable storage medium storing one or more computer programs adapted to cause a processor based system, such as a server 640 to execute steps comprising:

Receiving information for one or more users corresponding to user information and/or image data, corresponding to one or more machine readable images 104.

In some embodiments the server 640 will compare the received information and or image data corresponding to one or more machine readable images 104 that belong to one or more users. For example, the server 640 may compare the machine readable images 104 of multiple users to determine contest winners (e.g., as in a raffle) or to compare one or more aspects pertaining to the users' respective profile information, preferred setting information, game history information and/or previous game performance information etc.

In some embodiments, the received user information or image data will be new information pertaining to a specific user. In other embodiments the received information will correspond to updated user information or image data.

In exemplary embodiments, the server 640 will use the information to generate image data representing a new or updated machine readable image 104.

In some embodiments the server may transmit the updated user information or machine readable image 104 to another device; for example via a network 630 as described above with respect to FIG. 6. Additionally, in some embodiments the image data pertaining to the machine readable image 104 may be stored at the server or another location that is accessible via a network 630 such as the internet. For example, the machine readable image 104 may be made available in the form of a web page or as part of an online user profile.

While the invention herein disclosed has been described by means of specific embodiments and applications thereof, numerous modifications and variations could be made thereto by those skilled in the art without departing from the scope of the invention set forth in the claims.

What is claimed is:

1. An apparatus, comprising:
    a tangible surface; and
    a machine-readable visible image on the tangible surface, wherein the image comprises information that is encoded into the image and that is optically machine-readable from the image, wherein the image is configured to be image captured by a separate image capturing device when the image is positioned within a field of view of the image capturing device, and
    wherein the information is decoded by optically reading the image with the image capturing device;

wherein the information comprises an identity of a user and the following,
(i) at least a portion of the user's preferred setting information for one or more computer game applications,
(ii) game history information for the user for one or more computer game applications, and
(iii) previous game performance information for the user for one or more computer game applications.

2. The apparatus of claim 1, wherein the tangible surface comprises at least one of paper, cardboard, metal film, or plastic.

3. The apparatus of claim 1, wherein the tangible surface comprises a display screen.

4. The apparatus of claim 1, wherein the machine-readable visible image comprises a two-dimensional (2D) barcode.

5. A computer readable storage medium storing one or more computer programs that will cause a processor based system to execute steps comprising:
optically machine reading information from a first machine-readable image, wherein the information is encoded into the image and is decoded by optically reading the image with an optical input device;
identifying an identity of a user in the read information;
identifying the user's preferred setting information for a computer game application in the read information; and
automatically setting one or more user settings in the computer game application according to the user setting information.

6. The computer readable storage medium of claim 5, wherein the one or more computer programs will further cause the processor based system to execute steps comprising:
identifying profile information for the user in the read information; and
automatically selecting the computer game application based on a computer game application identity information in the read information.

7. The computer readable storage medium of claim 6, wherein the one or more computer programs will further cause the processor based system to execute steps comprising:
automatically starting the computer game application.

8. The computer readable storage medium of claim 5, wherein the one or more computer programs will further cause the processor based system to execute steps comprising:
identifying previous game performance information for the user in the read information; and
displaying at least a portion of the previous game performance information.

9. The computer readable storage medium of claim 5, wherein the one or more computer programs will further cause the processor based system to execute steps comprising:
identifying game history information for the user in the read information; and
displaying at least one item of the game history information.

10. The computer readable storage medium of claim 5, wherein the one or more computer programs will further cause the processor based system to execute steps comprising:
sending a request over a network requesting any updated information relating to the user.

11. The computer readable storage medium of claim 5, wherein the one or more computer programs will further cause the processor based system to execute steps comprising:
in response to the user playing the computer game, assembling current game performance information relating to the user's performance in the computer game; and
sending at least a portion of the assembled current game performance information over a network.

12. The computer readable storage medium of claim 5, wherein the one or more computer programs will further cause the processor based system to execute steps comprising:
reading information from a second machine-readable image; and
comparing at least a portion of the read information from the second machine-readable image to at least a portion of the read information from the first machine-readable image.

13. The computer readable storage medium of claim 5, wherein the one or more computer programs will further cause the processor based system to execute steps comprising:
adding the user to a user list.

14. The computer readable storage medium of claim 5, wherein:
the optical input device comprises an image capture device; and
the optically machine reading information from the first machine-readable image comprises using the image capture device to read the image.

15. The computer readable storage medium of claim 5, wherein the first machine-readable image comprises a two-dimensional (2D) barcode.

16. A computer readable storage medium storing one or more computer programs that will cause a processor based system to execute steps comprising:
receiving user information that comprises an identity of a user and the following,
(i) at least a portion of the user's preferred setting information for one or more computer game applications,
(ii) game history information for the user for one or more computer game applications, and
(iii) previous game performance information for the user for one or more computer game applications;
selecting at least a portion of the user information;
generating image data that represents a visual machine-readable representation; and
generating an optically machine-readable image from the image data, wherein the image comprises the selected user information which is encoded into the image and is decoded by optically reading the image with an optical input device.

17. The computer readable storage medium of claim 16, wherein the one or more computer programs will further cause the processor based system to execute steps comprising:
sending the generated image data over a network.

18. The computer readable storage medium of claim 16, wherein the one or more computer programs will further cause the processor based system to execute steps comprising:
printing the generated image.

19. The computer readable storage medium of claim 16, wherein the one or more computer programs will further cause the processor based system to execute steps comprising:

displaying the generated optically machine-readable image on a website.

20. The computer readable storage medium of claim 16, wherein the one or more computer programs will further cause the processor based system to execute steps comprising:
   updating at least a portion of the user information in response to at least one of,
      the user providing updated information, and
      the user playing one of the one or more computer game applications.

21. The computer readable storage medium of claim 20, wherein the one or more computer programs will further cause the processor based system to execute steps comprising:
   selecting at least a portion of the updated user information; and
   generating updated image data that represents a visual machine-readable representation comprising the selected updated user information.

22. The computer readable storage medium of claim 16, wherein the one or more computer programs will further cause the processor based system to execute steps comprising:
   receiving current game performance information for the user from over a network; and
   updating at least a portion of the user information based on the received current game performance information for the user.

23. The computer readable storage medium of claim 16, wherein the one or more computer programs will further cause the processor based system to execute steps comprising:
   receiving a request from over a network requesting updated information relating to the user; and
   sending updated information relating to the user over the network in response to the request.

24. The computer readable storage medium of claim 16, wherein the generated optically machine-readable image comprises a two-dimensional (2D) barcode.

25. The computer readable storage medium of claim 16, wherein the step of receiving the user information comprises reading a two-dimensional barcode.

26. The computer readable storage medium of claim 16, wherein the step of receiving the user information comprises receiving information from over a network.

* * * * *